United States Patent [19]

Beck et al.

[11] Patent Number: 4,496,064
[45] Date of Patent: Jan. 29, 1985

[54] BLOW MOLDED CONTAINER AND METHOD OF FORMING THE SAME

[75] Inventors: Martin H. Beck, Brookline; Suppayan M. Krishnakumar, Nashua, both of N.H.

[73] Assignee: The Continental Group, Inc., Stamford, Conn.

[21] Appl. No.: 324,162

[22] Filed: Nov. 23, 1981

[51] Int. Cl.³ .................. B65D 23/00; B29C 17/12
[52] U.S. Cl. ............................ 215/1 C; 264/530; 264/532; 264/536; 428/35
[58] Field of Search ............... 428/35; 215/1 C; 264/530, 532, 536

[56] References Cited

U.S. PATENT DOCUMENTS

| | | | |
|---|---|---|---|
| 3,651,186 | 3/1972 | Hall | 264/532 |
| 4,108,937 | 8/1978 | Martineu et al. | 264/532 |
| 4,305,904 | 12/1981 | Black | 264/536 |

Primary Examiner—John E. Kittle
Attorney, Agent, or Firm—Charles E. Brown

[57] ABSTRACT

This relates to a container which is formed of a thermoplastic material, preferably PET, wherein the container wall and flanges have a high degree of orientation and the required strength characteristics utilizing a minimum of resin in the formation thereof. An intermediate article of manufacture is formed with this article having a generally bottle-like configuration. The intermediate article of manufacture, which is blow molded from a conventional preform configuration, includes a lower portion in the configuration of the desired container and an upper portion which is an accommodation portion. The accommodation portion is removed from the container and becomes scrap which is reground. This abstract forms no part of the specification of this application and is not to be construed as limiting the claims of the application.

13 Claims, 13 Drawing Figures

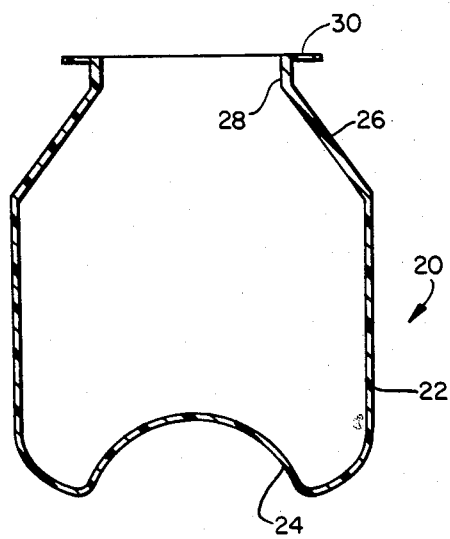
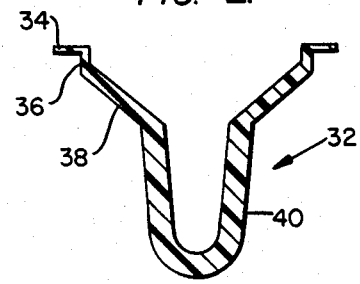
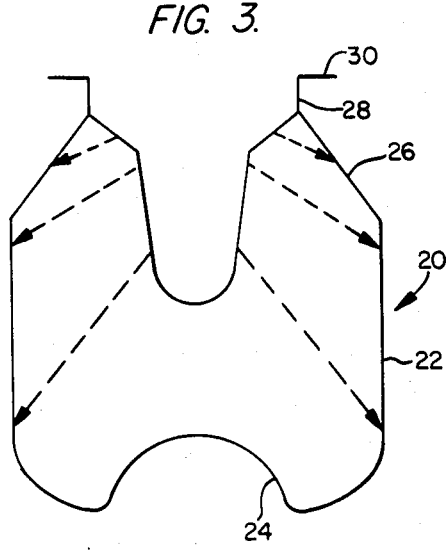
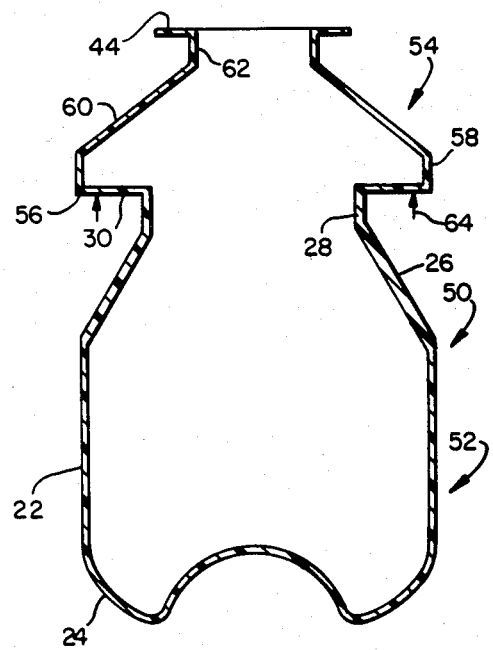
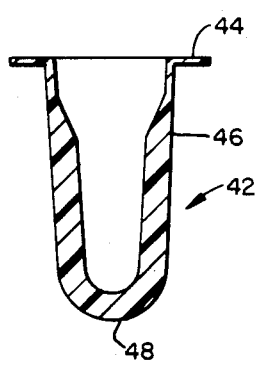
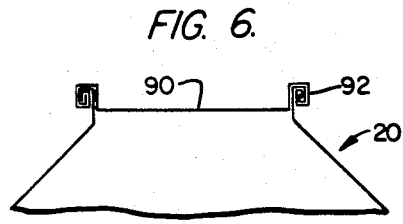
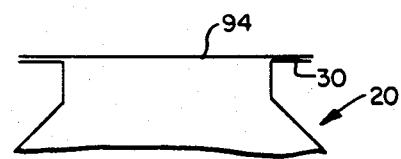

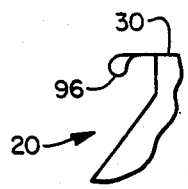
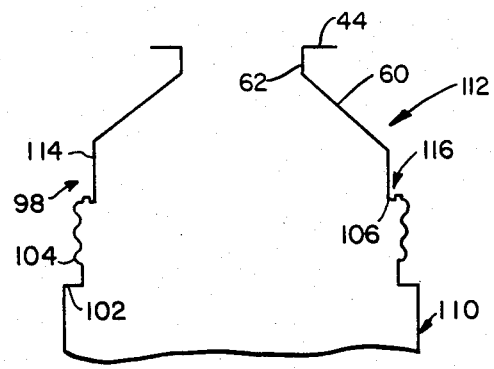
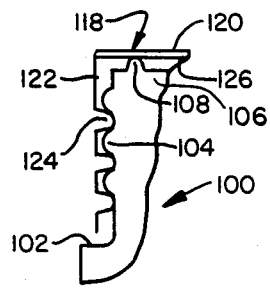
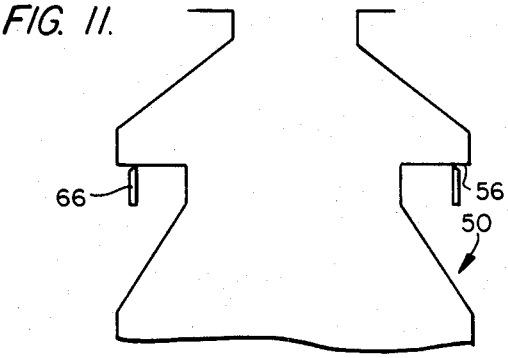
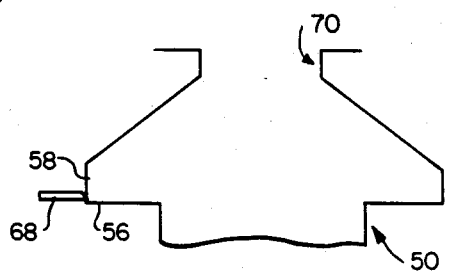
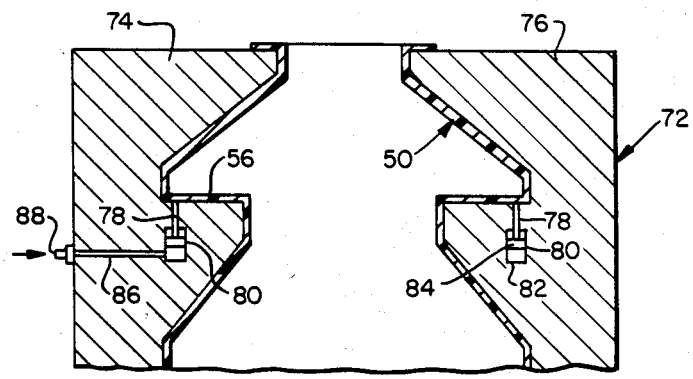

BLOW MOLDED CONTAINER AND METHOD OF FORMING THE SAME

This invention relates in general to new and useful improvements in plastic containers, and more particularly to a thermoplastic container which has a high degree of orientation and has sufficient strength to be utilized in the packaging of products under high gaseous pressure.

Numerous attempts have been made commercially to produce containers of thermoplastic material, particularly polyethylene terephthalate (PET). However, the efforts known to us have been restricted to the forming of such containers from sheet material with the result that there has not been sufficient orientation of the plastic material to provide the necessary strength. Most particularly, there has been an undue degree of axial cracking of the container body as well as flange cracking.

When the container is to be utilized for packaging products under high internal pressure such as carbonated beverages, it is desirable that the container be provided with a conventional metal end which is secured to the filled container utilizing a conventional double seaming operation. This places high bending stresses on the flange and if the flange is not biaxially oriented to a high degree, flange cracking will occur during the double seaming operation.

It is well known that a very high degree of biaxial orientation in the container wall is essential to a functional plastic container for packaging carbonated beverages. The preform to produce such a container is designed to give in the container a material stretch ratio in the hoop and axial directions of three to six to one and two to four to one, respectively. However, these stretching ratios are not possible in present sheet forming operations.

Consideration has been given to the blow molding of wide mouth containers, such as cans, starting with preforms. However, if the preform is to be utilized substantially in its entirety, as is now customary in bottle forming, the diameters of the mouth of the preform must match that of the resultant container and, as a result, the blow molding of the preform will result in insufficient biaxial orientation of the container particularly in the container body wall adjacent the closure flange.

In addition, when the preforms are conventionally formed by injection molding, the size of the injection mold and the tonnage of the injection molding machinery becomes very large, resulting in poor economics of preform forming.

In view of the foregoing, it is desirable to provide a small diameter preform as is customarily utilized in the blow molding of bottles with the preforms being of a materially lesser length than that of the resultant container. To utilize such preforms, material force must be made in existing modes of forming containers and most particularly there must be formed an intermediate article of manufacture which has a lower portion in the form of an accommodation element which permits the necessary biaxial orientation of the thermoplastic material throughout the container, the accommodation element being severed from the container and becoming reusable scrap.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a schematic sectional view of a container which is formed in accordance with this invention.

FIG. 2 is a schematic sectional view of a preform which would be required to form the container of FIG. 1 utilizing conventional blow molding concepts.

FIG. 3 is a schematic sectional view relating the preform to the resultant container and showing the disposition of the material in the preform in the resultant container.

FIG. 4 is a schematic sectional view through a preform which is utilized in accordance with this invention to form the container of FIG. 1 in a modified manner.

FIG. 5 is a schematic sectional view showing an intermediate article of manufacture formed from the preform of FIG. 4 utilizing conventional blow molding techniques in accordance with this invention.

FIG. 6 is a fragmentary schematic sectional view of a container formed from the intermediate product of FIG. 5 and having applied thereto a conventional end unit.

FIG. 7 is an enlarged fragmentary sectional view through a modified form of container which includes a sheet-like closure.

FIG. 8 is a fragmentary schematic sectional view of a modified closure flange arrangement.

FIG. 9 is a schematic sectional view of the upper part only of another intermediate product of manufacture wherein the neck portion of the resultant container is provided with integral screw threads.

FIG. 10 is a fragmentary schematic sectional view showing the container formed from the article of FIG. 9 equipped with a screw threaded closure.

FIG. 11 is a schematic fragmentary sectional view through the upper portion of the article of FIG. 5 showing the manner in which the desired container may be removed utilizing a circular knife.

FIG. 12 is a sectional view similar to FIG. 11, and shows the manner in which the container may be removed from the article of FIG. 5 utilizing a fixed blade and the rotation of the article.

FIG. 13 is a fragmentary sectional view taken through the article of FIG. 5 while the same remains in an associated blow mold and wherein separation of the container from the remainder of the article as effected by an axially movable blade.

Referring now to the drawings in detail, it will be seen that there is illustrated a can or like container which has been formed by blow molding. The can, which is identified by the numeral 20, has a cylindrical body 22 and a bottom 24 which may be of the modified champagne type so as to resist internal pressures. The upper part of the body 22 is tapered radially inwardly and axially upwardly as at 26, and terminates in a wide mouth 28 surrounded by a radially outwardly directed annular flange 30. The flange 30 is particularly adapted to have attached thereto in any one of many conventional methods a closure.

If one were to follow customary blow molding procedures, a preform such as the preform 32 of FIG. 2 would be required. It will be seen that the preform 32 includes an upper combined support and sealing flange 34 which surrounds a relatively wide mouth portion 36. The preform 32 then tapers as at 38 to a small diameter lower portion 40 which has a conventional preform configuration.

Referring now to FIG. 3 wherein both the preform of FIG. 2 and the desired container of FIG. 1 are shown, it will be seen that the flange 30 and the neck 28 of the container have no orientation whatsoever except that which may occur during the injection molding of the preform 32 in that there is no stretching of the material of the preform in the forming of the flange 30 and the neck 28.

It will also be seen that there is only a minor stretching of the preform in the formation of the conical top portion 26 and that only in the lower part of the container body 22 and in the bottom portion 24 is there considerable stretching of the preform and the necessary biaxial orientation.

Not only is the preform of FIG. 2 and the stetching of such preform in the blow molding of the container 20 such that the container 20 does not have sufficient biaxial orientation and thus does not have sufficient strength to withstand high internal pressures, but also the preform 32 is of a configuration which is not economically feasible when the preform is to be formed by an injection molding process. It is to be understood that the preform 32 is of a much larger size than the preforms conventionally utilized in the forming of blow molded containers of the same size as the container 20. Accordingly, it will be apparent that with the same mold size and capacity, only approximately one-half the number of preforms may be formed. Thus, this is highly uneconomical and makes the cost of forming the container 20 in the manner illustrated in FIG. 3 not economically feasible.

In accordance with this invention, it is desirable to utilize a conventional preform configuration such as the preform 42 illustrated in FIG. 4. Basically, the preform 42 will include a mounting or support flange 44, a generally cylindrical but slightly tapered body 46, and a generally hemispherical bottom 48.

Further, in accordance with this invention, it is proposed to blow mold a somewhat odd configuration hollow member which could be broadly identified as a bottle and will be so referred to hereinafter. The bottle is generally identified by the numeral 50, as shown in FIG. 5.

The bottle 50 will include a lower portion, generally identified by the numeral 52, in the form of the desired container 20 of FIG. 1, and an upper accommodation portion, generally identified by the numeral 54. The lower portion 52 will include the cylindrical body 22, the concave bottom 24, the tapered upper portion 26, the mouth 28 and the annular flange 30. It is to be understood that the flange 30 may be part of a wider and larger diameter flange 56 as will be discussed hereinafter. The accommodation portion 54 may have a short body portion 58 above the flange and then will have a tapered portion 60 which terminates in a cylindrical portion 62 which finally terminates in the original flange 44. The illustrated form of bottle 50 will be severed along the flange 56 on a circular pattern as indicated by the arrows 64. The accommodation portion 54 will then become scrap which may be readily reground in the customary manner for the further injection moldings of preforms such as the preform 42.

Reference is next made to FIG. 11 wherein the manner of severing or cutting the flange 56 is illustrated. It will be seen that there is illustrated a knife or blade 66 which is circular and which will cut a circular pattern as previously described when either the knife is rotated or when the bottle is rotated. It is also feasible that the knife 66 be in the form of a single blade which either may be rotated relative to the bottle 50 or may be fixed and the bottle rotated.

With reference to FIG. 12, it will be seen that there is a minor modification of the bottle 50 wherein the flange 56 will be of the same width and external diameter as the desired flange 30. In this event, instead of the flange 56 being severed, the cylindrical body 58 will be severed immediately above the flange 56 by means of a knife or blade 68 which is preferably fixed and wherein the bottle is rotated as indicated by the arrow 70.

Reference is now made to FIG. 13 wherein there is illustrated an upper portion only of a conventional split mold 72 which includes mold halves 74, 76. Each of the mold halves carries a semicircular blade or knife 78. Each knife 78 has associated therewith an extensible cylinder arrangement 80 may be either in the form of two or more small fluid motors for each knife 78 or, as is illustrated, may include a semi-circular cylinder 82 in which there is positioned a semi-annular piston 84. When the mold halves 74, 76 close, the cylinders 82 become a continuous annular cylinder and the pistons 84 function as a single annular piston.

Operating fluid may be directed into the lower portion of the cylinders 82 through a suitable fluid line 86 which has attached thereto a conventional supply line 88. Suitable spring means (not shown) may be utilized automatically to return the blades 78 to their retracted positions. It is to be understood that the blades 78 will be actuated while the bottle 50 is still under a slight internal pressure so that the flange 56 of the bottle will be backed up by air pressure.

Returning now to FIG. 6, it will be seen that the container 20 is illustrated as being closed by a conventional metal end 90 which may be of the easy opening type and which is secured to the container 20 by means of a conventional double seam 92 which incorporates the flange 30. This container is suitable for containing products under pressure such as carbonated beverages.

On the other hand, as shown in FIG. 7, the flange 30 may be undeformed and may be closed by means of a sheet-type closure 94 which is suitably bonded to the flange 30 and which may be peelable therefrom. Inasmuch as the sheet material utilized in the forming of the closure 94 may be conventional, no attempt is made here to specify the specific closure material.

In FIG. 8 the flange 30 is illustrated as having been reformed to include a peripheral curl 96 which may be utilized in conjunction with snap-on type closures.

In FIG. 9 there is illustrated a slightly modified form of bottle 98 which is particularly configured to define a container 100 for receiving a screw threaded closure. The container 100 will be similar to the container 20 except, instead of having the tapered portion 26, will have a small diameter shoulder 102 with a large diameter externally threaded neck portion 104 extending upwardly therefrom. Further, instead of the flange 56 of the bottle 50, there will be a narrow flange 106 which will have an upstanding sealing bead 108.

The bottle 98, like the bottle 50, includes a lower portion 110 which forms the container 100 and an upper portion 112 which forms the accommodation portion. The accommodation portion 112 will include a lower cylindrical portion 114 above the flange 106 which terminates in a tapered portion corresponding to the tapered portion 60. The extreme upper part of the accommodation portion 112 will have a cylindrical part 62 terminating in the flange 44.

The container 100 will be formed by severing the flange 106 closely adjacent the cylindrical portion 114 as indicated by the arrow 116 in any desired manner and generally in accordance with FIG. 11 and FIG. 13.

The general details of the container 100 in the top portion thereof are best shown in FIG. 10 wherein the container 100 is sealed by way of a screw threaded closure 118. It will be seen that the closure 118 will include an end panel 120 having a depending skirt 122 which is provided with internal threads 124 cooperating with the threads 104 of the container 100. The end panel carries a suitable sealing liner 126 which engages the sealing rib 108 and serves to seal the container.

It will be seen that the configuration of the containers 20 and 100 is such that by providing intermediate articles of manufacture as shown in FIGS. 5 and 9, the desired stretching of the preform in both axial and hoop directions may be such that a high degree of biaxial orientation is obtained in all portions of the resultant containers so that the resultant containers may have economical thin walls while having the desired strength characteristics.

It is to be understood that although only several specific container configurations have been illustrated and described herein, minor changes may be made in the containers and the method of forming the same without departing from the spirit and scope of the invention as defined by the appended claims.

We claim:

1. An intermediate article of manufacture comprising a blow molded thermoplastic article, said article including a lower portion in the form of a container having a tubular body, an open mouth and a peripheral closure receiving portion, all of said container having a high degree of biaxial orientation with the degree of biaxial orientation of said peripheral closure receiving portion approaching that of said tubular body, and an upper portion in the form of an accommodation element terminating in an open neck portion having substantially no orientation, and said peripheral closure receiving portion being of an outline materially greater than that of said open neck portion 2. An intermediate article of manufacture according to claim 1 wherein said peripheral closure receiving portion is in the form of a radially outwardly directed flange of a width at least as great as required for the double seaming of a metal end unit to said flange.

3. An intermediate article of manufacture according to claim 1 wherein said peripheral closure receiving portion is in the form of a radially outwardly directed flange lying in a general plane for receiving a sheet-like closure.

4. An intermediate article of manufacture according to claim 1 wherein said peripheral closure receiving portion is in the form of an externally threaded neck portion.

5. An intermediate article of manufacture according to claim 1 wherein said peripheral closure receiving portion is in the form of an externally threaded neck portion terminating in a radially inwardly directed annular flange.

6. An intermediate article of manufacture according to claim 1 wherein said peripheral closure receiving portion is in the form of an externally threaded neck portion terminating in a radially inwardly directed annular flange having an axially upwardly directed seal forming bead.

7. An intermediate article of manufacture according to claim 1 wherein said accommodation element flares radially outwardly and axially downwardly from said open neck portion to said peripheral closure receiving portion with a gradual increase in orientation both axially and radially.

8. An intermediate article of manufacture according to claim 1 wherein there is a predetermined axially facing circular severance line between said upper portion and said lower portion.

9. An intermediate article of manufacture according to claim 1 wherein said article is formed of PET.

10. A method of forming a blow molded thermoplastic container of the type wherein all portions of said container have a high degree of biaxial orientation, said method comprising the steps of blow molding from a thermoplastic preform an intermediate article of manufacture including a lower portion in the form of a container having a tubular body, an open mouth and a peripheral closure receiving portion, all of said container having a high degree of biaxial orientation with the degree of biaxial orientation of said peripheral closure receiving portion approaching that of said tubular body, and an upper portion in the form of an accommodation element terminating in an open neck portion having substantially no orientation, and said peripheral closure receiving portion being of an outline materially greater than that of said open neck portion, and severing said accommodation element from said container in an area having a high degree of biaxial orientation.

11. A method according to claim 10 wherein said severing is effected by means of a blade with there being relative movement between said blade and said intermediate article of manufacture, said article of manufacture is stationary, and said blade is axially advanced.

12. A method according to claim 10 wherein said severing is effected by means of a blade with there being relative movement between said blade and said intermediate article of manufacture, said article of manufacture is stationary and said blade is axially advanced while said article of manufacture is still in a blow mold.

13. A container as formed in accordance with the method of claim 10.

* * * * *